United States Patent
Nainar et al.

(10) Patent No.: US 11,444,871 B1
(45) Date of Patent: Sep. 13, 2022

(54) END-TO-END PATH SELECTION USING DYNAMIC SOFTWARE-DEFINED CLOUD INTERCONNECT (SDCI) TUNNELS

(71) Applicant: Cisco Technology, Inc., San Jose, CA (US)

(72) Inventors: Nagendra Kumar Nainar, Morrisville, NC (US); Robert Edgar Barton, Richmond (CA); Carlos M. Pignataro, Cary, NC (US); Jerome Henry, Pittsboro, NC (US); Olivier Pelerin, Holsbeek (BE); Shankar Vemulapalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/385,520

(22) Filed: Jul. 26, 2021

(51) Int. Cl.
*H04L 45/00* (2022.01)
*H04L 9/40* (2022.01)
*H04L 12/46* (2006.01)
*H04L 47/2425* (2022.01)
*H04L 61/4511* (2022.01)

(52) U.S. Cl.
CPC .......... *H04L 45/70* (2013.01); *H04L 12/4633* (2013.01); *H04L 47/2425* (2013.01); *H04L 61/4511* (2022.05); *H04L 63/029* (2013.01)

(58) Field of Classification Search
None
See application file for complete search history.

(56) References Cited

U.S. PATENT DOCUMENTS

| | | | |
|---|---|---|---|
| 2014/0351441 A1 | 11/2014 | Madani et al. | |
| 2015/0304209 A1 | 10/2015 | Choudhury et al. | |
| 2015/0319050 A1 | 11/2015 | Kasturi et al. | |
| 2016/0315808 A1 | 10/2016 | Saavedra | |
| 2017/0230274 A1 | 8/2017 | Filsfils et al. | |
| 2020/0374228 A1* | 11/2020 | Yang | H04L 45/124 |

FOREIGN PATENT DOCUMENTS

| | | | | |
|---|---|---|---|---|
| CN | 112019371 A | * | 12/2020 | ........... H04L 41/145 |
| CN | 109309621 B | * | 5/2021 | ......... H04L 12/4633 |

* cited by examiner

*Primary Examiner* — Jeffrey R Swearingen
(74) *Attorney, Agent, or Firm* — Lee & Hayes, P.C.

(57) ABSTRACT

Techniques for utilizing a cloud service to compute an end-to-end SLA-aware path using dynamic software-defined cloud interconnect (SDCI) tunnels between a user device and an access point-of-presence (POP) node and inter-POP tunnels of the SDCI. The cloud service may include a performance aware path instantiation (PAPI) component including a POP database for storing performance metrics associated with the POPs of the SDCI, an enterprise policy database for storing user specific policies, and/or a path computation component. The path computation component may compute the path, based on the user specific policies, performance metrics associated with the POP nodes, and/or real-time contextual data associated with the user device and/or destination device. The path may include a first tunnel between the user device and the most optimal access POP node of the SDCI and a second tunnel between the access POP node, through the internal POP nodes, and to the destination device.

20 Claims, 7 Drawing Sheets

END-TO-END PATH SELECTION USING DYNAMIC SOFTWARE-DEFINED CLOUD INTERCONNECT (SDCI) TUNNELS

TECHNICAL FIELD

The present disclosure relates generally to computing an end-to-end service level agreement (SLA) aware path using dynamic software-defined cloud interconnect (SDCI) tunnels between a user device and an optimal edge point-of-presence (POP) node and inter-POP tunnels of the SDCI.

BACKGROUND

With the evolution of software as a service (SaaS), platform as a service (PaaS), internet as a service (IaaS), and the like, and the increase in adoption of cloud services by enterprises, the nature of traffic flow as shifted from traditional models where all user traffic converged (both business and non-business) towards a centralized data center (DC). With the introduction of SaaS, multi-cloud models, and hybrid-cloud models, access to such cloud services is evolving into a direct internet access (DIA) model where user traffic directly access applications in multiple disparate cloud hosted systems. Thus, it is common to see direct traffic modalities between remote workers and cloud services. However, as more business traffic is using the internet as the underlay, the quality of service (QoS) primarily relies on internet connection quality. As such, traffic flow from a user to a cloud service may have limited to no service level agreement (SLA) guarantees.

While software-defined wide-area networks (SDWANs) are an option, they may not be the most viable option for all connectivity scenarios. That is, there are a number of limitations to supporting SLAs for remote workers, such as, for example, not all home networks are dual-homed (e.g., multi-protocol label switching (MPLS), or multiple internet service providers (ISPs)), there is no dedicated bandwidth guarantee from ISPs and any delays or drops in a transit path may have little to no insight to pivot traffic over an alternate path, the use of $4^{th}$-generation (4G) and/or $5^{th}$-generation (5G) as a backup path is not a cost-effective solution and does not guarantee an end-to-end diverse path, and creating a tunnel to the nearest DC to steer traffic over a dedicated (SLA) guaranteed link from the DC to the cloud is ineffective as users may end up steering traffic from coast-to-coast depending on the location of the DC.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
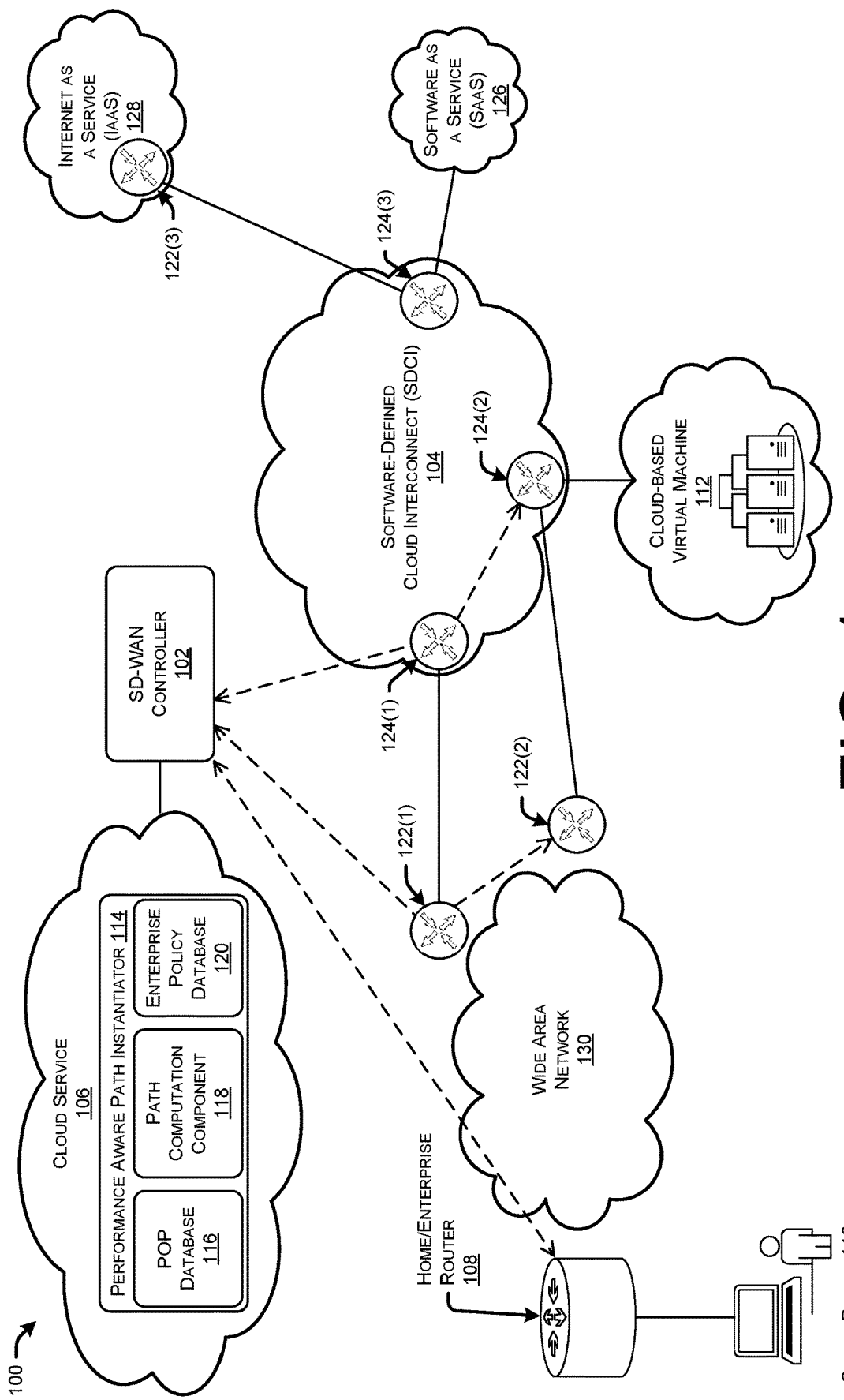
FIG. 1 illustrates a system-architecture diagram of an example environment for implementing at least some of the various technologies disclosed herein. The environment includes an SDWAN controller for collecting performance metrics associated with multiple point-of-presence (POP) nodes of a software defined cloud interconnection (SDCI) service and a cloud service for computing a dynamic end-to-end performance and SLA-aware path from a user device to a destination device.

This disclosure describes a method of using a cloud service to compute an end-to-end SLA-aware path using dynamic SDCI tunnels between a user device and an optimal edge POP node and inter-POP tunnels of the SDCI. The method includes receiving, at a cloud service, a request for an end-to-end path between client device and a destination device. The end-to-end path may be at least partially established using a software-defined cloud interconnect (SDCI). The method may further include identifying, for a user account associated with the client device, a performance requirement associated with the user account for communicating traffic over the end-to-end path. The method may further include identifying performance data indicating performance metrics of one or more paths between one or more points of presence (POP) of the SDCI. The method may further include calculating, at the cloud service, the path between the user device and destination device based at least in part on the performance metrics associated with the one or more paths satisfying the performance requirement associated with the user account. The method may further include causing data to be communicated from the client device to the destination device using the path.

Additionally, or alternatively, the method includes receiving, at a cloud service, a request for an end-to-end path between client device and a destination device. The request may indicate a performance requirement associated with a user account for communicating traffic over the end-to-end path. The end-to-end path may be at least partially established using a software-defined cloud interconnect (SDCI). The method may further include identifying performance data indicating performance metrics of one or more paths between one or more points of presence (POP) of the SDCI. The method may further include calculating, at the cloud service, the path between the user device and destination device based at least in part on the performance metrics associated with the one or more paths satisfying the performance requirement associated with the user account. The method may further include causing data from the client device to be communicated to the destination device using the path.

The techniques described in this disclosure may be performed as a method and/or by a system having non-transitory computer-readable media storing computer-executable instructions that, when executed by one or more processors, performs the techniques described above.

Example Embodiments

As discussed above, there are a number of limitations to supporting SLAs for remote workers, such as, for example, not all home networks are dual-homed (e.g., multi-protocol label switching (MPLS), or multiple internet service providers (ISPs)), there is no dedicated bandwidth guarantee from ISPs and any delays or drops in a transit path may have little to no insight to pivot traffic over an alternate path, the use of $4^{th}$-generation (4G) and/or $5^{th}$-generation (5G) as a backup path is not a cost-effective solution and does not guarantee an end-to-end diverse path, and creating a tunnel to the nearest DC to steer traffic over a dedicated (SLA) guaranteed link from the DC to the cloud is ineffective as users may end up steering traffic from coast-to-coast depending on the location of the DC.

This disclosure describes techniques for a cloud service including a performance-aware path instantiation (PAPI) component that may access real-time performance metrics associated with point of presence (POP) nodes of a software-defined cloud interconnection (SDCI) service (e.g., Megaport) and user-specific policies to compute an end-to-end service level agreement (SLA) aware path connecting a user device to a destination device and/or service using dynamic SDCI tunnels between the user device and an optimal edge access POP node and inter-POP tunnels of the SDCI. The SDCI service may include a plurality of edge access POP nodes spread throughout the internet, which a user may connect to. As previously mentioned, the cloud service may include a PAPI component, and may be configured to provide various additional cloud services, such as, but not limited to, a domain name service (DNS) layer security component, a secure web gateway component, a cloud-delivered firewall component, and/or a cloud access security broker (CASB) component. The cloud service may be associated with a software-defined wide-area network (SD-WAN) controller configured to collect real-time performance metrics between colocation facilities (e.g., DC facilities associated with an enterprise and/or a user), SDCI POP nodes, various additional cloud services (e.g., SaaS, virtual machines, etc.), and various access networks. Additionally, or alternatively, the SDCI service may communicate with the cloud service and/or SD-WAN controller to periodically provide SDCI internal network telemetry data (e.g., performance metrics associated with tunnels between internal POP nodes of the SDCI). The PAPI component may further include an enterprise policy database for storing per-user and/or per-tenant polices, a POP database for storing the real-time performance metrics associated with the edge access POP nodes and/or internal POP nodes of the SDCI, and/or a path computation component configured to compute a path from a user device to a destination device and/or service using the data included in the enterprise policy database and/or the POP database.

As previously mentioned, the cloud service may utilize various components to provide cloud services, such as, for example, the PAPI component, a DNS-layer security component, a secure web gateway component, a cloud-delivered firewall component, and/or a CASB component. In some examples, the PAPI component may be configured to access real-time performance metrics associated with SDCI POP nodes and user-specific enterprise policies to compute an end-to-end SLA-aware path connecting a user device to a destination device and/or service. In some examples, the path may include a first tunnel (also referred to herein as an external tunnel) from the user device to an edge POP node (also referred to herein as an access POP node) that is determined to be the most optimal edge pop node for the user device. For example, the PAPI component may leverage real-time contextual information, such as, for example, a location of the user device, a location of the destination device and/or service, an SLA associated with the user device, and/or internal path telemetry data (e.g., performance metrics between individual POP nodes of the SDCI), to determine the best SDCI access POP node for establishing the first tunnel to the user device from among multiple candidate SDCI edge POP nodes. Additionally, or alternatively, the path may include a second tunnel (also referred to herein as an internal tunnel) through the internal SDCI POP nodes and to the destination device and/or service. For example, the PAPI component may leverage the real-time contextual information to determine which internal SDCI POP nodes meet the SLA requirements associated with the user device, internal POP nodes having the most favorable current workload (e.g., selecting a POP node supporting less communication paths than another POP node), and/or the most favorable performance metrics between internal POP nodes of the SDCI. In some examples, the path may be established by stitching together the external tunnel, between the user device and the most optimal SDCI edge POP node, and the internal tunnel, through the internal SDCI POP nodes and to the destination device and/or service. In some examples, the tunnels may be stitched together using overlay encapsulations, such as, for example, segment routing over IPv6 dataplane (SRv6) encapsulation, virtual extensible local area network (VxLAN) encapsulation, and the like.

As previously mentioned, the cloud service may include additional built-in security components, such as, for example, the DNS-layer security component, the secure web gateway component, a cloud-delivered firewall component, and/or a CASB component. In some examples, the DNS-layer security component may be configured to block network threats at the DNS and IP network layers. Additionally, or alternatively, the secure web gateway component may be configured to provide full proxy capabilities to improve performance and reduce risk in the network by efficiently logging, inspecting, and/or controlling web traffic, providing URL and application controls and protection against malware. Additionally, or alternatively, the cloud-delivered firewall component may be configured to provide remote users, using a direct-to-internet access (DIA) connection, a cloud-delivered firewall to log all activity and block unwanted traffic using IP, port, and/or protocol rules. The CASB component may be configured to provide an enterprise with the ability to detect and report on cloud applications in use across an associated organization.

Take for example, an environment including a cloud service having a PAPI component, an SDCI service having one or more access POP nodes and/or one or more internal POP nodes, an SD-WAN controller associated with an SD-WAN, a client device associated with the SD-WAN, and/or a secure access service edge (SASE) DNS provider associated with the SDCI service. As previously mentioned, the PAPI component may include a POP database, a path computation component, and/or an enterprise policy database. In some examples, the SD-WAN may be at least partially associated with an enterprise. In some examples, the one or more access POP nodes of the SDCI may be distributed throughout the internet and configured as access point(s) to the internal POP nodes of the SDCI for a user device. In some examples, the SDCI service and the SASE DNS provider may be tightly coupled, such that they may share SLA information to optimize customer handling.

As previously described, the PAPI component may include a POP database, an enterprise policy database, and/or a path computation component. In some examples, the POP database of the PAPI component may include various database entries that track all possible SDCI POP locations, including IP data associated with SDCI access POP nodes, for example, and/or real-time performance metrics between SDCI datacenter sites, SDCI POP nodes, various cloud services, and/or access networks. In some examples, the real-time performance metrics may be collected by the SDCI service and/or by the SD-WAN controller and communicated to the cloud service, where the PAPI component may store the metrics in the POP database. Additionally, or alternatively, the enterprise policy database may include user specific policies. For example, an enterprise may sign up for a specific SLA for certain traffic types and/or classes of users. In some examples, the SLA may include bandwidth guarantees, latency guarantees, jitter guarantees, and the like. Additionally, or alternatively, the user specific policies may be SLA and/or security specific. In some examples, the path computation component may access the POP database and/or the enterprise policy database and utilize the data stored therein to compute a path requested by a user establishing a connection via the cloud service.

When a home router and/or enterprise router receives a DNS resolution request query from the user device, the request may be transmitted to the DNS service where the DNS service may examine who is trying to resolve the DNS query. In some examples, the DNS service may determine that the DNS resolution request is associated with a known customer of the SDCI service, and the DNS service may forward the DNS resolution to the PAPI component. In some examples, the DNS service may forward the DNS resolution as a name server (NS) record. Additionally, or alternatively, the DNS service may determine that the DNS resolution request is not associated with a known customer of the SDCI service, and the DNS service may forward the DNS resolution to the PAPI component as a regular A-record. Additionally, or alternatively, the home router and/or enterprise router may be configured to determine if there is a policy and/or SLA requirement associated with the DNS resolution, and may forward the DNS resolution to the PAPI component.

In such examples where the PAPI component receives the DNS resolution, the PAPI component compares the DNS resolution against a policy in the enterprise policy database to identify an SLA requirement for the user. In some examples, real-time contextual information, such as, the location of the user device and the location of the destination, for example, may be sent to the PAPI component. In some examples, the real-time contextual information may be sent to the PAPI component as a part of the DNS resolution. Additionally, or alternatively, the real-time contextual information may be sent to the PAPI component separately from the DNS resolution.

In such examples where the PAPI component receives the real-time contextual information, the PAPI component may utilize the real-time contextual information to identify the optimal SDCI access POP node. In some examples, the path computation component may be leveraged to determine the optimal SDCI access POP node. In some examples, the PAPI component and/or the path computation component may leverage data entries stored in the POP database, indicating the SDCI internal network telemetry data and/or performance metrics probed between the user device and all available SDCI access POP nodes. Using the data from the POP database and the real-time contextual information, the PAPI component and/or the path computation component may determine the most optimal SDCI access POP node for the user device.

When determining the most optimal SDCI access POP node for the user device, the PAPI component and/or path computation component may perform an SLA lookup for the customer and the type of cloud service being accessed. Based on the SLA, the probes between the user device and all of the candidate SDCI access POP nodes, and the internal path telemetry from the POP database, the most optimal SDCI access POP node is determined. With the most optimal SDCI access POP node identified, the DNS record may be transmitted to the DNS service, and the DNS service may return a response, such as, for example, the A-record to the home router and/or enterprise router associated with the user device.

Additionally, or alternatively, the DNS may return an extended response to the home router and/or enterprise router associated with the user device. In some examples, the extended response may include additional information associated with alternate candidate SDCI access POP nodes. In such examples, the home router, enterprise router, and/or user device may comprise logic stored thereon to select the most optimal SDCI access POP nodes from among the candidate SDCI access POP nodes. In some examples, an overlay header and/or additional metadata (e.g., In-situ OAM (iOAM)) may be used to store and/or transmit additional information associated with the candidate SDCI access POP nodes.

In some examples, the PAPI service may leverage the per-customer and/or per-tenant policies stored in the enterprise policy database to determine whether or not a traffic flow from the user device to the destination device and/or service requires SLA enforcement. In such examples where the flow from the user device to the destination device and/or service does not require SLA enforcement, the traditional A-record DNS response is returned back to the home router and/or enterprise router associated with the user device. Additionally, or alternatively, in such examples where the flow from the user device to the destination device and/or service requires SLA enforcement, the path computation component may use the location information indicated by the real-time contextual data to determine the most optimal SDCI access POP node and establish one or more external tunnels from the user device to one or more of the candidate SDCI access POP nodes and/or one or more internal tunnels from a candidate SDCI access POP node, through the SDCI internal POP nodes, and to the destination device and/or service.

Once the one or more external tunnels and the one or more internal tunnels have been established, the path computation component may stitch the tunnels together to form one or more end-to-end monitored paths. In some examples, the tunnels may be stitched together using overlay encapsulations, such as, for example, segment routing over IPv6 dataplane (SRv6) encapsulation, virtual extensible local area network (VxLAN) encapsulation, and the like. In some examples, the details required to establish the external tunnel may be passed back from the path computation component of the PAPI component to the DNS service, and may be included in the DNS response. In some examples, the DNS response may be used by the home router, enterprise router, and/or the user device to establish the external tunnel to the optimal candidate SDCI access POP node. In some examples, the DNS response may include various details required to establish the external tunnel, such as, for example, one or more IP addresses associated with respective candidate SDCI access POP nodes, one or more certificates required to establish the external tunnel, one or more credentials required to establish the external tunnel, an indication of the type of overlay encapsulation, and the like.

With the one or more external tunnels established and the one or more internal tunnels established, the PAPI component may maintain the tunnels in a stateful manner, such that the PAPI component may be configured to continuously monitor the performance of the one or more external tunnels between the user device and candidate SDCI access POP nodes and/or the one or more internal tunnels between the one or more candidate SDCI access POP nodes, the one or more SDCI internal POP nodes, and the destination device and/or service. In some examples, the PAPI component and/or the path computation component may be configured to re-establish the one or more internal tunnels and/or the one or more external tunnels as required (e.g., if performance metrics of a first tunnel indicate a fall off in performance, a second tunnel having more favorable performance metrics may be established in place of the first tunnel).

Additionally, or alternatively, the PAPI component and/or the path computation component may configure the one or more external tunnels and/or the one or more internal tunnels as redundant tunnels (e.g., having a same source and destination while using a different path) where a tunnel may be configured as a primary or secondary tunnel and/or an active or inactive tunnel for load sharing purposes.

Although the techniques are described as being implemented using a cloud service, including computing servers, data centers, and/or a cloud computing network, the techniques are generally applicable for any network of devices managed by an entity where virtual resources may be provisioned. In some instances, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to using a cloud service to compute an end-to-end SLA-aware path using dynamic SDCI tunnels between a user device and an optimal edge POP node and inter-POP tunnels of the SDCI. For example, the techniques described herein may allow for the establishment of one or more external tunnels connecting a user device to respective optimal SDCI access POP nodes. One or more SDCI access POP nodes may be determined as the most optimal from among multiple candidate SDCI access POP nodes based on real-time contextual data (e.g., user device location, destination location, etc.) and/or user-specific policies (e.g., policies indicating SLA requirements and the like). Additionally, the techniques described herein may allow for the probing of internal tunnels between SDCI internal POP nodes to determine performance metrics of the internal tunnels to select the internal tunnels that have the most favorable performance metrics for establishing the end-to-end path. Further, multiple external and/or internal tunnels may be established and configured as primary and/or secondary tunnels for load balancing of data along separate paths from a single source and to a single destination.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for implementing at least some of the various technologies disclosed herein. The environment 100 includes an SDWAN controller for collecting performance metrics associated with multiple point-of-presence (POP) nodes of a software defined cloud interconnection (SDCI) service 104 and a cloud service 106 for computing a dynamic end-to-end performance and SLA-aware path from home router and/or enterprise router 108 associated with a user device (also referred to herein as a client device) 110 to a destination device and/or service, such as, for example, a cloud-based virtual machine 112.

The cloud service 106 may include one or more components, subcomponents, and/or configurations. For example, the cloud service 106 may include a PAPI component 114. In some examples, the PAPI component 114 may include a POP database 116, a path computation component 118, and/or an enterprise policy database 120. In some examples, the POP database 116 of the PAPI component 114 may include various database entries that track all possible POP locations associated with the SDCI service 104, including IP data associated with access POP nodes 122(1)-(3) of the SDCI service 104, for example, and/or real-time performance metrics between datacenter sites associated with the SDCI service 104, internal POP nodes 124(1)-(3) associated with the SDCI service 104, various cloud services, such as, for example, SaaS 126, and/or access networks, such as, for example IaaS 128. In some examples, the real-time performance metrics may be collected by the SDCI service 104 and/or by the SD-WAN controller 102 and communicated to the cloud service 106, where the PAPI component 114 may store the metrics in the POP database 116. Additionally, or alternatively, the enterprise policy database 120 may include user specific policies. For example, an enterprise may sign up for a specific SLA for certain traffic types and/or classes of users. In some examples, the SLA may include bandwidth guarantees, latency guarantees, jitter guarantees, and the like. Additionally, or alternatively, the user specific policies may be SLA and/or security specific. In some examples, the path computation component 118 may access the POP database 116 and/or the enterprise policy database 120 and utilize the data stored therein to compute a path requested by a user establishing a connection via the cloud service 106.

The client device 110 may comprise any type of device configured to communicate using various communication protocols (e.g., VPN, SSL, TLS, DTLS, and/or any other protocol) over one or more networks, such as, for example, a wide-area network (WAN) 130. For instance, the client device 110 may comprise a personal client device (e.g., desktop computers, laptop computers, phones, tablets, wearable devices, entertainment devices such as televisions, etc.), network devices (e.g., servers, routers, switches, access points, etc.), and/or any other type of computing device.

The example service provider(s), such as, for example, the SDCI service 104, the cloud service 106, the cloud-based virtual machine 112, the SaaS 126, and/or the IaaS 128, may provide one or more services to various client devices via the network 130. The service provider(s) may include, in some examples, an application service, a website, or another cloud-based service. In some examples, the service provider(s) may provide basic resources such as processor (CPU), memory (RAM), storage (disk), and networking (bandwidth) to the client device 110. Additionally, in some examples, the service providers, such as, for example, the cloud-based virtual machine 112 may provide, host, or otherwise support one or more application services for the client devices 110 to connect to and use. In some instances, computing resources associated with and/or allocated to the service provider(s) may be stored in various data centers located at different physical locations. For instance, first computing resources of the service provider(s) may be stored in a first data center located in a first geographic location while second computing resources of the service provider(s) may be stored in a second data center located in a second geographic location. The data centers may be physical facilities or buildings located across geographic areas that are designated to store networked devices. For example, the data centers may be located at each of the individual internal POP nodes 124 and/or the individual access POP nodes 122 of the SDCI service 104. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

As previously described, the SDCI service 104 may comprise one or more internal POP nodes 124(1)-(3) configured to route traffic through the SDCI service 104 and to a destination computer and/or service, such as, for example, the cloud-based virtual machine 112, and/or the SaaS 126. Additionally, or alternatively, the SDCI service 104 may comprise one or more access POP nodes 122(1)-(3) configured to route traffic from a home router and/or enterprise router 108 associated with a client device 110 to one or more of the internal POP nodes 124. Together, external tunnels may be established between the client device 110 and the access POP nodes 122 and internal tunnels may be established between the external POP nodes 122, the internal POP nodes 124, and the ultimate destination to form an end-to-end SLA aware path. It should be appreciated that while only 3 access POP nodes 122 and 3 internal POP nodes 124 are illustrated, the SDCI service 104 may comprise any number of access POP nodes 122 and/or internal POP nodes 124.

As previously described, the PAPI component 114 and/or the path computation component 118 may be configured to access real-time performance metrics associated with SDCI POP nodes 122, 124 and user-specific enterprise policies to compute an end-to-end SLA-aware path connecting a user device 110 to a destination device and/or service 112. In some examples, the path may include a first tunnel (also referred to herein as an external tunnel) from the user device 110 to an access POP node 122 (also referred to herein as an edge POP node) that is determined to be the most optimal edge pop node for the user device 110. For example, the PAPI component 114 and/or the path computation component 118 may leverage real-time contextual information, such as, for example, a location of the user device 110, a location of the destination device and/or service 112, an SLA associated with the user device 110, and/or internal path telemetry data (e.g., performance metrics between individual internal POP nodes 124 of the SDCI service 104), to determine the best SDCI access POP node 122 for establishing the first tunnel to the user device from among multiple candidate SDCI access POP nodes 122. Additionally, or alternatively, the path may include a second tunnel (also referred to herein as an internal tunnel) through the internal POP nodes 124 of the SDCI service 104 and to the destination device and/or service 112. For example, the PAPI component 114 and/or the path computation component 118 may leverage the real-time contextual information to determine which internal POP nodes 124 meet the SLA requirements associated with the user device 110, internal POP nodes 124 having the most favorable current workload (e.g., selecting a POP node supporting less communication paths than another POP node), and/or the most favorable performance metrics between internal POP nodes 124 of the SDCI service 104. In some examples, the path may be established by stitching together the external tunnel, between the user device 110 and the most optimal SDCI edge POP node 122, and the internal tunnel, through the internal SDCI POP nodes 124 and to the destination device and/or service 112. In some examples, the tunnels may be stitched together using overlay encapsulations, such as, for example, segment routing over IPv6 dataplane (SRv6) encapsulation, virtual extensible local area network (VxLAN) encapsulation, and the like.

Figure 2:
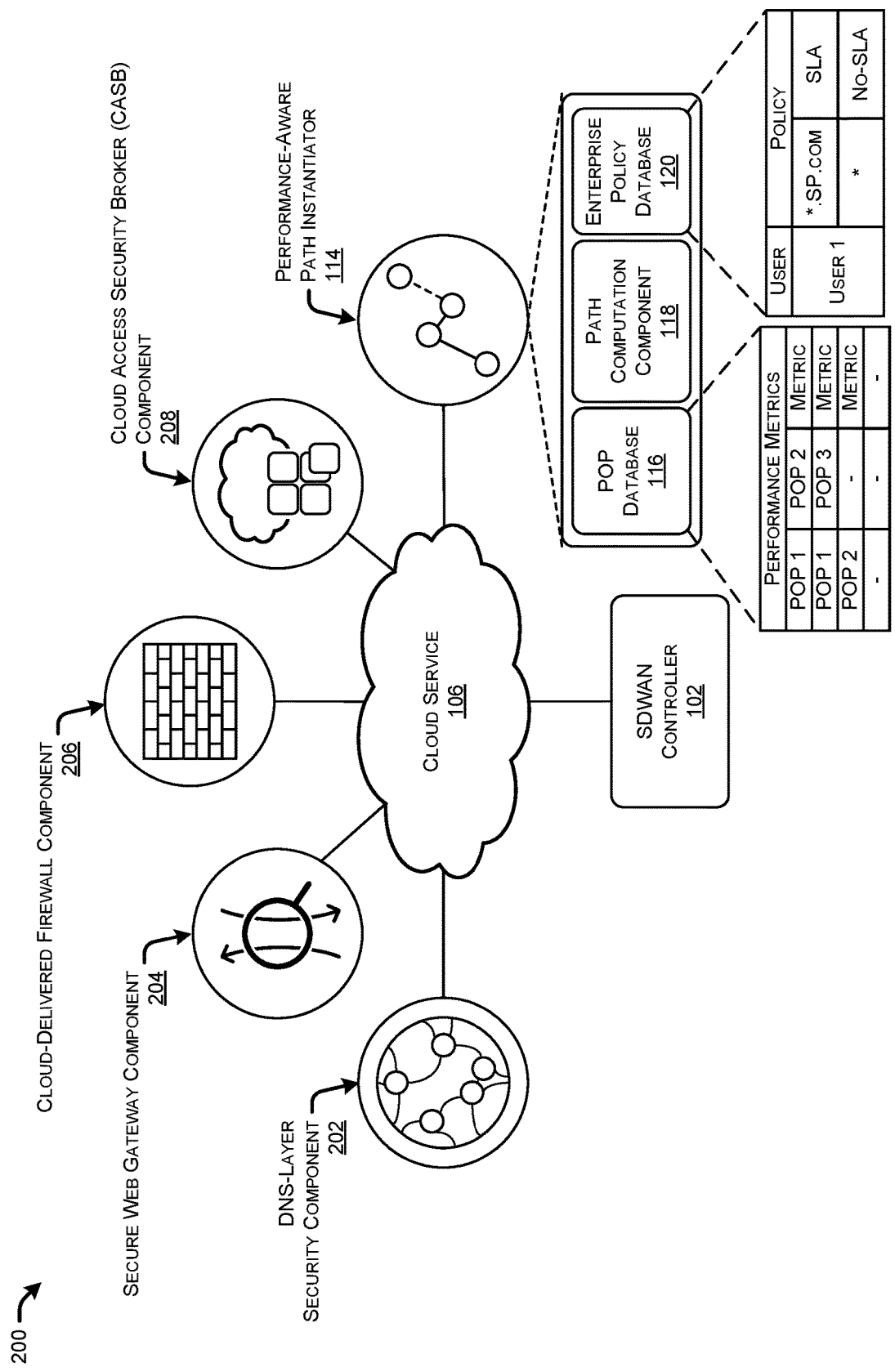
FIG. 2 illustrates a component diagram of an example cloud service including a performance-aware path instantiation (PAPI) component.

FIG. 2 illustrates a component diagram of an example cloud service 106 including a performance-aware path instantiation (PAPI) component 114. In some examples, the cloud service 106 may be configured as the cloud service 106 as described with respect to FIG. 1. Additionally, or alternatively, the cloud service 106 may utilize various components to provide cloud services, such as, for example, the PAPI component 114, a DNS-layer security component 202, a secure web gateway component 204, a cloud-delivered firewall component 206, and/or a cloud access security broker (CASB) component 208.

The PAPI component 114 may include one or more subcomponents, such as, for example, a POP database 116, a path computation component 118, and/or an enterprise policy database 120. In some examples, the POP database 116 may be configured to store real-time performance metrics associated with the access POP nodes of an SDCI service and/or internal POP nodes of an SDCI service. In some examples, the path computation component 118 configured to compute a path from a user device to a destination device and/or service using the data included in the enterprise policy database 120 and/or the POP database 116. In some examples, the enterprise policy database 120 may be configured to store per-user and/or per-tenant polices.

In some examples, the PAPI component 114 may leverage the path computation component 118, and may be configured to access real-time performance metrics associated with POP nodes of an SDCI service and user-specific enterprise policies to compute an end-to-end SLA-aware path connecting a user device to a destination device and/or service. For example, the PAPI component 114 may receive a DNS resolution and in response, the PAPI component 114 may compare the DNS resolution against a policy in the enterprise policy database 120 to identify an SLA requirement for the user. In some examples, real-time contextual information, such as, the location of the user device and the location of the destination, for example, may be sent to the PAPI component 114. In some examples, the real-time contextual information may be sent to the PAPI component 114 as a part of the DNS resolution. Additionally, or alternatively, the real-time contextual information may be sent to the PAPI component 114 separately from the DNS resolution.

Additionally, or alternatively, the PAPI component 114 may be configured to utilize the real-time contextual information to identify the most optimal access POP node of the SDCI, based on the user associated with the DNS resolution. In some examples, the path computation component 118 may be leveraged to determine the most optimal access POP node. In some examples, the PAPI component 114 and/or the path computation component 118 may leverage data entries stored in the POP database 116, indicating the SDCI internal network telemetry data and/or performance metrics probed between the user device and all available access POP nodes of the SDCI service. Using the data from the POP database 116 and the real-time contextual information, the PAPI component 114 and/or the path computation component 118 may determine the most optimal access POP node for the user device.

When determining the most optimal SDCI access POP node for the user device, the PAPI component 114 and/or path computation component 118 may perform an SLA lookup for the customer and the type of cloud service being accessed. Based on the SLA, the probes between the user device and all of the candidate SDCI access POP nodes, and the internal path telemetry from the POP database 116, the path computation component 118 may determine the most optimal SDCI access POP node for the associated user device. With the most optimal SDCI access POP node identified, the DNS record may be transmitted to the DNS service, and the DNS service may return a response, such as, for example, the A-record to a home router and/or enterprise router associated with the user device.

As previously mentioned, the cloud service 106 may include additional built-in security components, such as, for example, the DNS-layer security component 202, the secure web gateway component 204, a cloud-delivered firewall component 206, and/or a CASB component 208. In some examples, the DNS-layer security component 202 may be configured to block network threats at the DNS and IP network layers. Additionally, or alternatively, the secure web gateway component 204 may be configured to provide full proxy capabilities to improve performance and reduce risk in the network by efficiently logging, inspecting, and/or controlling web traffic, providing URL and application controls and protection against malware. Additionally, or alternatively, the cloud-delivered firewall component 206 may be configured to provide remote users, using a direct-to-internet access (DIA) connection, a cloud-delivered firewall to log all activity and block unwanted traffic using IP, port, and/or protocol rules. The CASB component 208 may be configured to provide an enterprise with the ability to detect and report on cloud applications in use across an associated organization.

Figure 3:
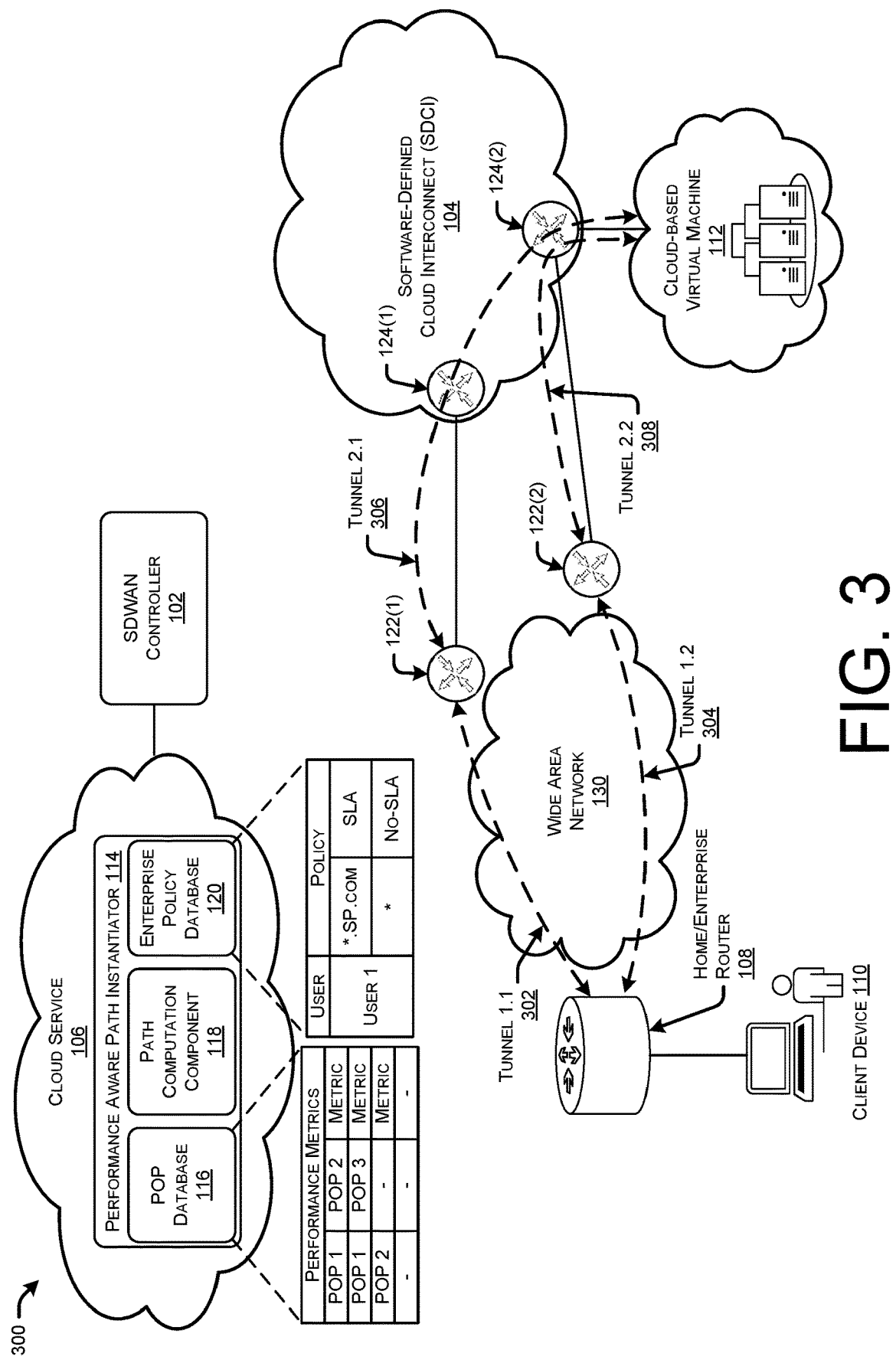
FIG. 3 illustrates system-architecture diagram of an example environment including an SDWAN controller and a cloud service for computing an end-to-end SLA-aware path using dynamic SDCI tunnels between a user device and an optimal edge POP node and inter-POP tunnels of the SDCI.

FIG. 3 illustrates system-architecture diagram of an example environment 300 including an SDWAN controller 102 and a cloud service 106 for computing an end-to-end SLA-aware path using dynamic SDCI tunnels between a user device 110 and one or more optimal edge POP nodes and inter-POP tunnels of an SDCI service 104. In some examples, the environment 300 may correspond to at least a portion of the environment 100 as described with respect to FIG. 1.

As previously mentioned, the cloud service 106 may include a PAPI component 114 and the PAPI component 114 may include one or more subcomponents, such as, for example, a POP database 116, a path computation component 118, and/or an enterprise policy database 120. In some examples, the environment 300 may include a software-defined wide-area-network (SD-WAN) 130. The SD-WAN 130 may be at least partially associated with an enterprise. In some examples, the one or more access POP nodes 122 of the SDCI service 104 may be distributed throughout the internet and configured as access point(s) to the internal POP nodes 124 for a user device 110 utilizing the SDCI service 104. In some examples, the SDCI service 104 may be tightly coupled to a SASE DNS provider, such that they may share SLA information to optimize customer handling.

When a home router and/or enterprise router 108 receives a DNS resolution request query from the user device 110, the request may be transmitted to the DNS service where the DNS service may examine who is trying to resolve the DNS query. In some examples, the DNS service may determine that the DNS resolution request is associated with a known customer of the SDCI service 104, and the DNS service may forward the DNS resolution to the PAPI component 114. In some examples, the DNS service may forward the DNS resolution as a name server (NS) record. Additionally, or alternatively, the DNS service may determine that the DNS resolution request is not associated with a known customer of the SDCI service 104, and the DNS service may forward the DNS resolution to the PAPI component 114 as a regular A-record. Additionally, or alternatively, the home router and/or enterprise router 108 may be configured to determine if there is a policy and/or SLA requirement associated with the DNS resolution, and may forward the DNS resolution to the PAPI component 114.

In some examples, the PAPI component 114 may utilize real-time contextual information, such as, the location of the user device 110 and the location of the destination (e.g., virtual machine 112), for example, to identify the most optimal access POP node(s) 122 for the user device 110 to utilize the SDCI service 104. Additionally, or alternatively, the PAPI component 114 and/or the path computation component 118 may leverage data entries stored in the POP database 116, indicating the SDCI internal network telemetry data and/or performance metrics probed between the user device 110 and all available SDCI access POP node(s) 122. Additionally, or alternatively, the PAPI component 114 and/or path computation component 118 may perform an SLA lookup for the customer and the type of cloud service being accessed (e.g., the cloud-based virtual machine 112). Based on the real-time contextual information, the SLA, the probes between the user device 110 and all of the candidate access POP nodes 122, and the internal path telemetry from the POP database 116, the PAPI component 114 and/or the path computation component 118 may determine the most optimal SDCI access POP node(s) 122 for the user device 110 to access the SDCI service 104. For example, the path computation component 118 may determine that a first access POP node 122(1) is an optimal access POP node 122 available for the user device 110. Additionally, or alternatively, the path computation component 118 may determine that a second access POP node 122(2) is an optimal access POP node 122 available for the user device 110. In some examples, the first access POP node 122(1) may be configured as a primary access POP node 122 while the second access POP node 122(2) may be configured as a secondary access POP node 122.

With the first access POP node 122(1) configured as the primary access POP node 122(1), the DNS record may be transmitted to the DNS service, and the DNS service may return a response, such as, for example, the A-record to the home router and/or enterprise router 108 associated with the user device 110.

Additionally, or alternatively, the DNS may return an extended response to the home router and/or enterprise router 108 associated with the user device 110. In some examples, the extended response may include additional information associated with alternate candidate access POP nodes 122, such as, for example, the second access POP node 122(2), configured as the secondary access POP node 122(2). In such examples, the home router 108, enterprise router 108, and/or user device 110 may comprise logic stored thereon to select the most optimal SDCI access POP nodes 122 from among the candidate access POP nodes 122. In some examples, an overlay header and/or additional metadata (e.g., In-situ OAM (iOAM)) may be used to store and/or transmit additional information associated with the secondary access POP node 122(2).

As previously described, the PAPI component 114 may leverage the per-customer and/or per-tenant policies stored in the enterprise policy database 120 to determine whether or not a traffic flow from the user device 110 to the destination device and/or service 112 requires SLA enforcement. In such examples where the flow from the user device 110 to the destination device and/or service 112 does not require SLA enforcement, the traditional A-record DNS response is returned back to the home router and/or enterprise router 108 associated with the user device 110. Additionally, or alternatively, in such examples where the flow from the user device 110 to the destination device and/or service 112 requires SLA enforcement, the path computation component 118 may use the location information indicated by the real-time contextual data to determine the most optimal access POP node 122 and establish one or more external tunnels from the user device 110 to one or more of the candidate access POP nodes 122 and/or one or more internal tunnels from a candidate access POP node 122, through the SDCI internal POP nodes 124, and to the destination device and/or service 112.

For example, tunnel 1.1 302 may be configured as a primary external tunnel bridging a primary path from the home router and/or enterprise router 108 associated with the user device 110 to the primary access POP node 122(1). Additionally, or alternatively, tunnel 1.2 304 may be configured as a secondary external tunnel bridging a secondary path from the home router and/or enterprise router 108 associated with the user device 110 to the secondary access POP node 122(2). Further, tunnel 2.1 306 may be configured as the primary internal tunnel bridging the primary path from the primary access POP node 122(1), through the primary internal POP node 124(1) and the secondary internal POP node 122(2), and to the destination device and/or service 112. Additionally, or alternatively, tunnel 2.2 308 may be configured as the secondary internal tunnel bridging the secondary path from the secondary access POP node 122(2), through the secondary internal POP node 124(2), and to the destination device and/or service 112.

Once the one or more external tunnels 302, 304 and the one or more internal tunnels 306, 308 have been established, the path computation component 118 may stitch the tunnels together to form one or more end-to-end monitored paths (e.g., the primary path and the secondary path described above). With the one or more paths established, the PAPI component 118 may maintain the tunnels in a stateful manner, such that the PAPI component 118 may be configured to continuously monitor the performance of the one or more external tunnels 302, 304 between the user device 110 and candidate access POP nodes 122 and/or the one or more internal tunnels 306, 308 between the one or more candidate access POP nodes 122, the one or more internal POP nodes 124, and the destination device and/or service 112. In some examples, the PAPI component 114 and/or the path computation component 118 may be configured to re-establish the one or more internal tunnels 306, 308 and/or the one or more external tunnels 302, 304 as required. For example, if performance metrics of one of the tunnels associated with the primary path 302, 306 indicate a falloff in performance, a heavy workload, or the like, the one or more tunnels of the secondary path 304, 308 may be determined to have more favorable performance metrics, and the secondary path may be established and/or given priority in place of the first path. Additionally, or alternatively, the path computation component 118 may give priority to one path over another, for load balancing purposes.

Figure 4:
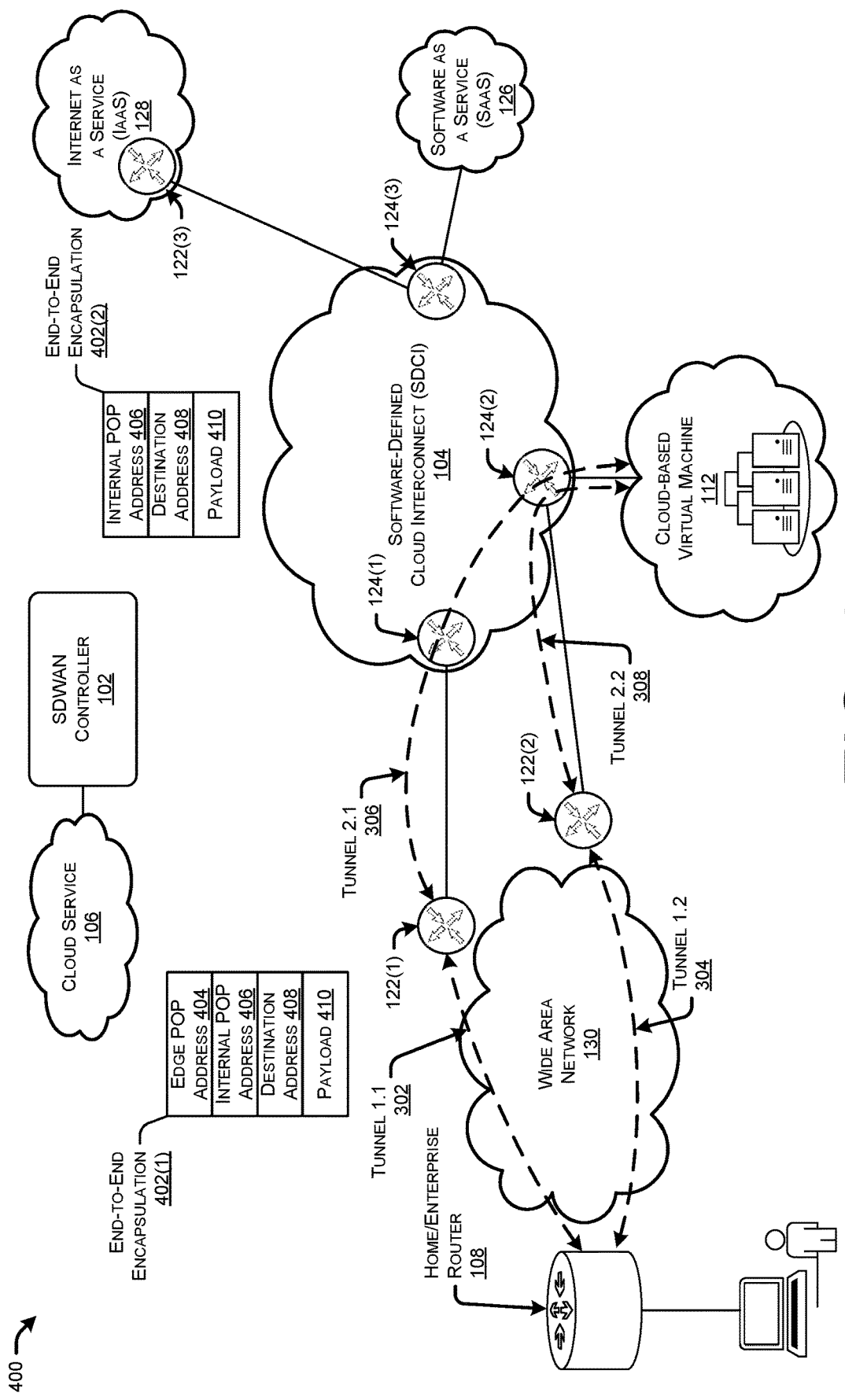
FIG. 4 illustrates a system architecture diagram of an example environment including an SDWAN controller and a cloud service and an example end-to-end overlay encapsulation utilized to steer traffic from a user device to a destination device using SDCI POP tunnels.

FIG. 4 illustrates a system architecture diagram of an example environment 400 including an SDWAN controller 102 and a cloud service 106 and an example end-to-end overlay encapsulation 402 utilized to steer traffic from a user device 110 to a destination device and/or service 112 using one or more internal and/or external POP tunnels 302-308 of an SDCI service 104. In some examples, the environment 400 may correspond to the environment(s) 100 and/or 300 as described with respect to FIGS. 1 and 3, respectively.

Once the one or more external tunnels, such as, for example, the primary external tunnel 302 and/or the secondary external tunnel 304, and the one or more internal tunnels, such as, for example the primary internal tunnel 306 and/or the secondary external tunnel 308 have been established, the path computation component 118 may stitch together the primary external tunnel 302 and the primary internal tunnel 306 and/or the secondary external tunnel 304 and the secondary internal tunnel 308 to form one or more end-to-end monitored paths, such as, for example the primary path and the secondary path.

In some examples, the external tunnels 302, 304 and the respective internal tunnels 306, 308 may be stitched together using overlay encapsulations, such as, for example, segment routing over IPv6 dataplane (SRv6) encapsulation, virtual extensible local area network (VxLAN) encapsulation, and the like. In some examples, the details required to establish the external tunnel(s) 302, 304 may be passed back from the path computation component 118 of the PAPI component 114 to a DNS service, and may be included in a DNS response returned back to the home router and/or enterprise router 108. In some examples, the DNS response may be used by the home router 108, enterprise router 108, and/or the user device 110 to establish the external tunnel(s) 302, 304 to the respective candidate access POP node(s) 122(1), 122(2). In some examples, the DNS response may include various details required to establish the external tunnel(s) 302, 304, such as, for example, one or more IP addresses associated with respective access POP nodes 122, one or more certificates required to establish the external tunnel(s) 302, 304, one or more credentials required to establish the external tunnel(s) 302, 304, an indication of the type of overlay encapsulation, and the like. In some examples, an end-to-end encapsulation 402 may be utilized to steer traffic over the desired path.

In some examples, the end-to-end encapsulation 402(1) may include an edge POP address 404, an internal POP address 406, a destination address 408, and a payload 410. In some examples, the edge POP address 404 may be configured as an outer header to route communications between the home router and/or enterprise router 108 associated with the user device 110 and the access POP node 122 having the IP address included in the edge POP address 404 header. For example, the edge POP address 404 may include an address, such as, for example, an IP address, of the first access POP node 122(1), and the home router and/or enterprise router 108 associated with the user device may utilize the edge POP address 404 included in the outer header to transmit data using the primary external tunnel between the user device 110 and the first access POP node 122(1). In some examples, the internal POP address 406 may be configured as a secondary header to route communications between the access POP node 122 having the IP address included in the edge POP address header 404 and along the internal path of the internal POP nodes 124 of the SDCI service. For example, the internal POP address 406 may include an address, such as, for example, an IP address associated with the first internal POP node 124(1) and/or the primary internal tunnel, and the access POP node 122(1) may utilize the internal POP address 406 included in the secondary header to transmit data using the primary internal tunnel between the first access POP node 122(1), the first internal POP node 124(1), the second internal POP node 124(2), and the ultimate destination 112. In some examples, the destination address 408 may be configured as an inner header to direct the traffic from the internal path towards the ultimate destination, such as, for example, the cloud-based virtual machine 112. For example, the destination address 408 may include the address, such as, for example, an IP address associated with the ultimate destination 112, and the payload 410 may be directed through the internal tunnel to the ultimate destination 112. In some examples, the payload 410 may be configured store the communication data being transmitted between the user device 110 and the ultimate destination 112.

Figure 5:
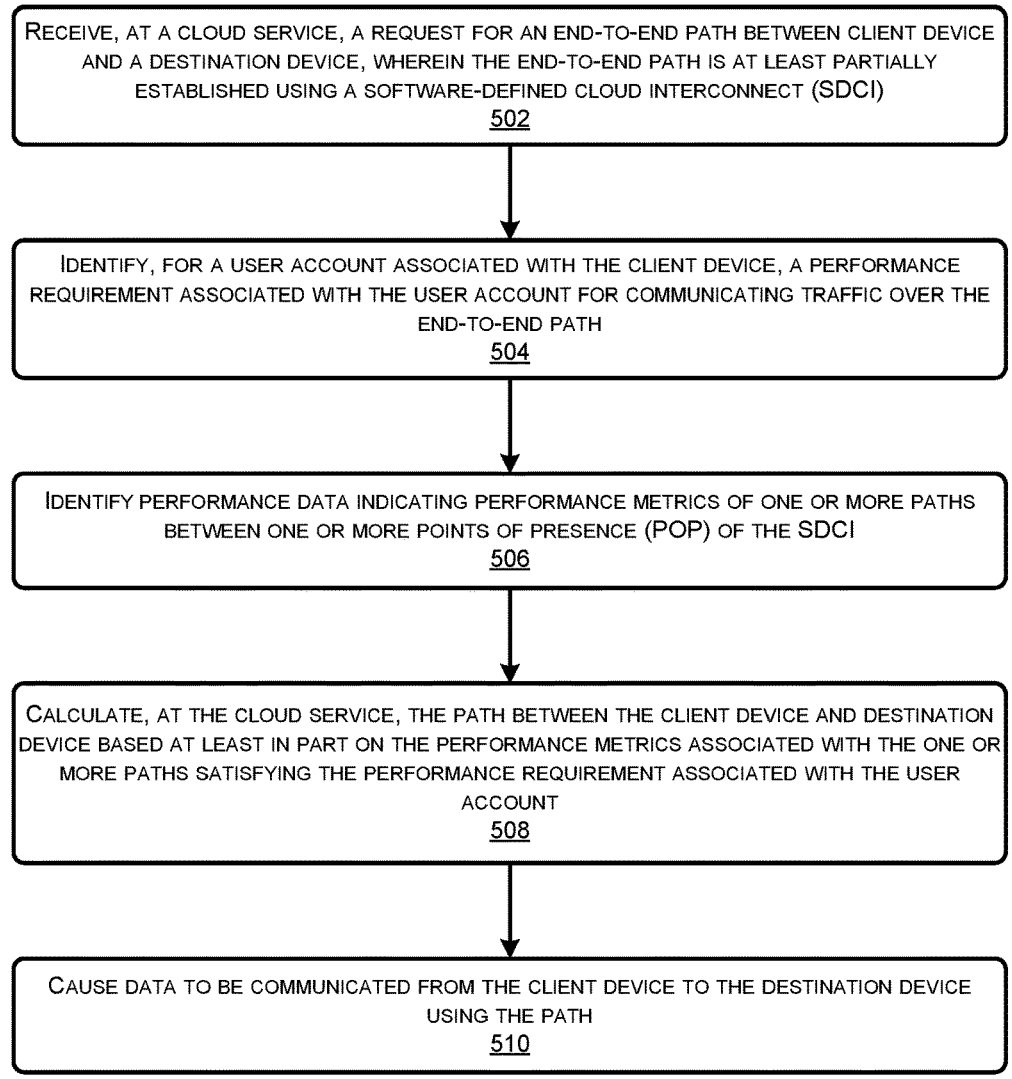
FIG. 5 illustrates a flow diagram of an example method for using a cloud service to compute an end-to-end SLA-aware path using dynamic SDCI tunnels between a user device and an optimal edge POP node and inter-POP tunnels of the SDCI.
Figure 6:
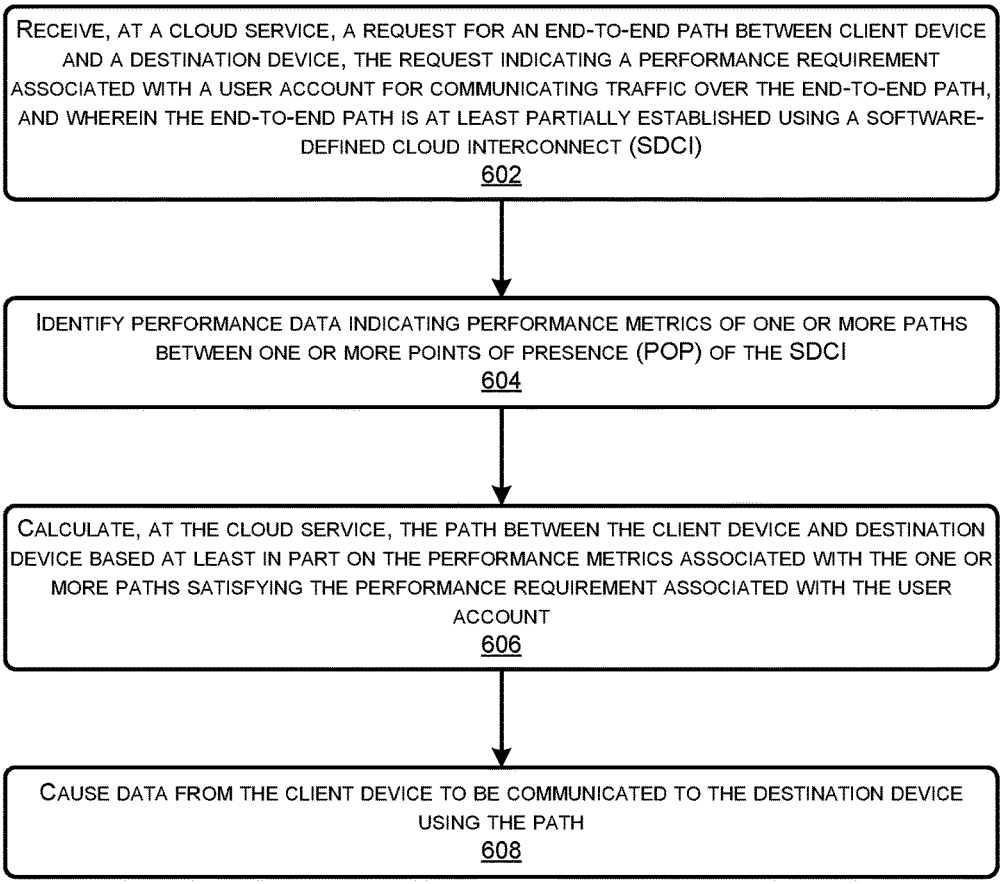
FIG. 6 illustrates a flow diagram of an example method for using a cloud service to compute an end-to-end SLA-aware path using dynamic SDCI tunnels between a user device and an optimal edge POP node and inter-POP tunnels of the SDCI.

FIGS. 5 and 6 illustrate flow diagrams of example methods 500 and 600 and that illustrate aspects of the functions performed at least partly by the cloud service 106, the SDCI service 104, and/or the SDWAN controller 102 as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for using a cloud service 106 to compute an end-to-end SLA-aware path using dynamic SDCI tunnels between a user device and an optimal edge POP node and inter-POP tunnels of the SDCI service 104.

At 502, the method 500 may include receiving, at a cloud service, a request for an end-to-end path between client device and a destination device. In some examples, the cloud service may be configured as cloud service 106, and may include the PAPI component 114, the POP database 116, the path computation component 118, and/or the enterprise database as described with respect to FIG. 1. In some examples, the end-to-end path is at least partially established using a software-defined cloud interconnect (SDCI). In some examples, the SDCI may be configured as the SDCI service 104 as described with respect to FIG. 1.

At 504, the method 500 may include identifying, for a user account associated with the client device, a performance requirement associated with the user account for communicating traffic over the end-to-end path. In some examples, the performance requirement may be based on an SLA and/or a policy associated with the user account. Additionally, or alternatively, the performance requirement may be determined by the cloud service. Additionally, or alternatively, the performance requirement may be stored in the enterprise policy database.

At 506, the method 500 may include identifying performance data indicating performance metrics of one or more paths between one or more points of presence (POP) of the SDCI. In some examples, the performance data may be identified by the cloud service. Additionally, or alternatively, the one or more POPs of the SDCI may be configured as the one or more access POP nodes 122 and/or the one or more internal POP nodes 124 associated with the SDCI service 104 as described with respect to FIG. 1. Additionally, or alternatively, the performance data may be stored in the POP database.

At 508, the method 500 may include calculating the path between the user device and destination device. In some examples, the path may be calculated based at least in part on the performance metrics associated with the one or more paths satisfying the performance requirement associated with the user account. Additionally, or alternatively, the cloud service may be configured to calculate the path between the user device and the destination device. In some examples, the destination device may comprise a destination service.

At 510, the method 500 may include causing data to be communicated from the client device to the destination device using the path. Additionally, or alternatively, the method 500 may include causing data to be communicated from the destination device to the client device using the path. In some examples, causing the data to be communicated using the path may be based on the end-to-end encapsulation 402 including the edge POP address 404, the internal POP address 406, the destination address 408, and/or the payload 410 as described with respect to FIG. 4.

Additionally, or alternatively, the method 500 may include providing, by the cloud service, an indication of the path to at least one device associated with the path. In some examples, the at least one device may comprise any one of a DNS service, an access POP node, an internal POP node, the home router and/or enterprise router, and/or the user device.

Additionally, or alternatively, the method 500 may include sending, from the cloud service and to a Software-Defined-Networking (SDN) controller associated with the cloud service, an indication of the path between the user device and the destination device. Additionally, or alternatively, the method 500 may include programming, by the SDN controller and based at least in part on the indication, the path between the user device and the destination device.

In some examples, programming the path may include providing an indication of the path to at least one of the one or more POP of the SDCI. Additionally, or alternatively, programming the path may include establishing the external tunnels, the internal tunnels, and/or stitching the tunnels together, as described with respect to FIGS. 1-4.

In some examples, a first path of the one or more paths between the one or more POP of the SDCI utilizes a first type of network and a second path of the one or more paths between the one or more POP of the SDCI utilizes a second type of network. In some examples, the second type of network may be different from the first type of network. In some examples, the first and/or second type of network may comprise any one of an internet network, a 4th-generation (4G) broadband cellular network, a 5th-generation (5G) broadband cellular network, a multiprotocol label switching (MPLS) network, and the like.

Additionally, or alternatively, the method 500 may include sending an indication of the path from the cloud service and to the client device. In some examples, wherein causing the data to be communicated from the client device to the destination device may be based at least in part on sending the indication of the path to the client device. Additionally, or alternatively, the method 500 may include sending, from the cloud service and to a domain name service (DNS) associated with the cloud service, an indication of the user account associated with the client device. Additionally, or alternatively, the method 500 may include receiving, at the cloud service and from the DNS, an indication of a policy associated with the user account. In some examples, the policy may indicate a service level agreement (SLA) associated with the user account. In some examples, identifying the performance requirement associated with the user account may be based at least in part on the SLA associated with the user account.

In some examples, the request may include an indication of a current location associated with the client device. Additionally, or alternatively, the method 500 may include identifying, by the cloud service and based at least in part on the current location associated with the client device, a first POP of the one or more POP of the SDCI. Additionally, or alternatively, the method 500 may include calculating the path between the user device and the destination device based at least in part on identifying the first POP of the one or more POP of the SDCI.

In some examples, the performance data may be first performance data and the performance metrics may be first performance metrics. Additionally, or alternatively, the method 500 may include receiving, at the cloud service and from a Software-Defined-Networking (SDN) controller associated with the cloud service at a first time. In some examples, the first performance data may indicate the first performance metrics of the one or more paths between the one or more POP of the SDCI. Additionally, or alternatively, the method 500 may include storing, in a database associated with the cloud service, the first performance metrics in association with the first time. Additionally, or alternatively, the method 500 may include receiving, at the cloud service and from the SDN controller at a second time, second performance data indicating second performance metrics of the one or more paths between the one or more POP of the SDCI. In some examples, the second time may be subsequent to the first time. Additionally, or alternatively, the method 500 may include storing, in the database associated with the cloud service, the second performance metrics in association with the second time.

In some examples, the path may be a first path. Additionally, or alternatively, the method 500 may include determining, by the cloud service and based at least in part on the performance requirement, that at least a first performance metric of the second performance metrics is more favorable than the first performance metric of the first performance metrics. Additionally, or alternatively, the method 500 may include calculating, at the cloud service and based at least in part on determining that at least the first performance metric of the second performance metrics is more favorable than the first performance metric of the first performance metrics, a second path between the user device and the destination device. Additionally, or alternatively, the method 500 may include causing the data to be communicated from the client device to the destination device using the second path.

In some examples, the performance requirement may include at least one of a bandwidth requirement, a latency requirement, a jitter requirement, and/or a security requirement.

In some examples, the request includes an indication of a current location associated with the client device. Additionally, or alternatively, the method 500 may include identifying, at the cloud service, an edge POP associated with the SDCI based at least in part on the current location associated with the client device and the performance requirement associated with the user account. Additionally, or alternatively, the method 500 may include providing an indication of the edge POP to a Software-Defined-Networking (SDN) controller associated with the cloud service to establish a first secure tunnel between the client device and the edge POP. Additionally, or alternatively, the method 500 may include identifying, at the cloud service, one or more internal POP of the SDCI from among the one or more POP of the SDCI based at least in part on the performance requirement and the edge POP. In some examples, the one or more internal POP of the SDCI may include a first internal POP that can be connected to the edge POP. Additionally, or alternatively, the method 500 may include providing an indication of the one or more internal POP of the SDCI to the SDN controller to establish a second secure tunnel using the one or more paths between the one or more internal POP of the SDCI. Additionally, or alternatively, the method 500 may include providing an indication of the first internal POP of the one or more internal POP of the SDCI to the SDN controller to connect the first secure tunnel to the second secure tunnel. Additionally, or alternatively, the method 500 may include causing data to be communicated from the client device to the destination device using the path based at least in part on connecting the first secure tunnel to the second secure tunnel.

Additionally, or alternatively, the method 500 may include determining, at the cloud service, a first candidate path comprising one or more first paths between one or more first POP of the one or more POP of the SDCI. In some examples, the one or more first paths may be associated with first performance metrics of the performance metrics. Additionally, or alternatively, the method 500 may include determining, at the cloud service, a second candidate path comprising one or more second paths between one or more second POP of the one or more POP of the SDCI. In some examples, the one or more second paths may be associated with second performance metrics of the performance metrics. Additionally, or alternatively, the method 500 may include determining, at the cloud service and based at least in part on the performance requirement, that the first performance metrics are more favorable than second performance metrics. In some examples, calculating the path between the user device and the destination device comprises calculating the path including the one or more first paths between the one or more first POP of the SDCI may be based at least in part on determining that the first performance metrics are more favorable than the second performance metrics.

FIG. 6 illustrates a flow diagram of an example method 600 for using a cloud service 106 to compute an end-to-end SLA-aware path using dynamic SDCI tunnels between a user device and an optimal edge POP node and inter-POP tunnels of the SDCI service 104.

At 602, the method 600 may include receiving, at a cloud service, a request for an end-to-end path between client device and a destination device. In some examples, the request may indicate a performance requirement associated with a user account for communicating traffic over the end-to-end path. In some examples, the end-to-end path may be at least partially established using a software-defined cloud interconnect (SDCI). In some examples, the cloud service may be configured as cloud service 106, and may include the PAPI component 114, the POP database 116, the path computation component 118, and/or the enterprise database as described with respect to FIG. 1. Additionally, or alternatively, the SDCI may be configured as the SDCI service 104 as described with respect to FIG. 1. In some examples, the performance requirement may be based on an SLA and/or a policy associated with the user account. Additionally, or alternatively, the performance requirement may be determined by the cloud service. Additionally, or alternatively, the performance requirement may be stored in the enterprise policy database.

At 604, the method 600 may include identifying performance data indicating performance metrics of one or more paths between one or more points of presence (POP) of the SDCI. In some examples, the performance data may be identified by the cloud service. Additionally, or alternatively, the one or more POPs of the SDCI may be configured as the one or more access POP nodes 122 and/or the one or more internal POP nodes 124 associated with the SDCI service 104 as described with respect to FIG. 1. Additionally, or alternatively, the performance data may be stored in the POP database.

At 606, the method 600 may include calculating the path between the user device and destination device. In some examples, the path may be calculated based at least in part on the performance metrics associated with the one or more paths satisfying the performance requirement associated with the user account. Additionally, or alternatively, the cloud service may be configured to calculate the path between the user device and the destination device. In some examples, the destination device may comprise a destination service.

At 608, the method 600 may include causing data to be communicated from the client device to the destination device using the path. Additionally, or alternatively, the method 500 may include causing data to be communicated from the destination device to the client device using the path. In some examples, causing the data to be communicated using the path may be based on the end-to-end encapsulation 402 including the edge POP address 404, the internal POP address 406, the destination address 408, and/or the payload 410 as described with respect to FIG. 4.

In some examples, the request may be received from a domain name service (DNS) associated with the cloud service, and/or the performance requirement may indicate a service level agreement (SLA) associated with the user account.

In some examples, a first path of the one or more paths between the one or more POP of the SDCI utilizes a first type of network and a second path of the one or more paths between the one or more POP of the SDCI utilizes a second type of network. In some examples, the second type of network may be different from the first type of network.

In some examples, the performance requirement may include at least one of a bandwidth requirement, a latency requirement, a jitter requirement, and/or a security requirement.

Additionally, or alternatively, the method 600 may include sending, from the cloud service and to a Software-Defined-Networking (SDN) controller associated with the cloud service, an indication of the path between the user device and the destination device. In some examples, the SDN controller may correspond to the SD-WAN 102 as described with respect to FIGS. 1, 3, and/or 4. Additionally, or alternatively, the method 600 may include programming, by the SDN controller and based at least in part on the indication, the path between the user device and the destination device. In some examples, programming the path may include providing an indication of the path to at least one of the one or more POP of the SDCI.

Additionally, or alternatively, the method 600 may include determining, at the cloud service, a first candidate path comprising one or more first paths between one or more first POP of the one or more POP of the SDCI. In some examples, the one or more first paths may be associated with first performance metrics of the performance metrics. Additionally, or alternatively, the method 600 may include determining, at the cloud service, a second candidate path comprising one or more second paths between one or more second POP of the one or more POP of the SDCI. In some examples, the one or more second paths may be associated with second performance metrics of the performance metrics. Additionally, or alternatively, the method 600 may include determining, at the cloud service and based at least in part on the performance requirement, that the first performance metrics are more favorable than second performance metrics. In some examples, calculating the path between the user device and the destination device may comprise calculating the path including the one or more first paths between the one or more first POP of the SDCI based at least in part on determining that the first performance metrics are more favorable than the second performance metrics.

Figure 7:
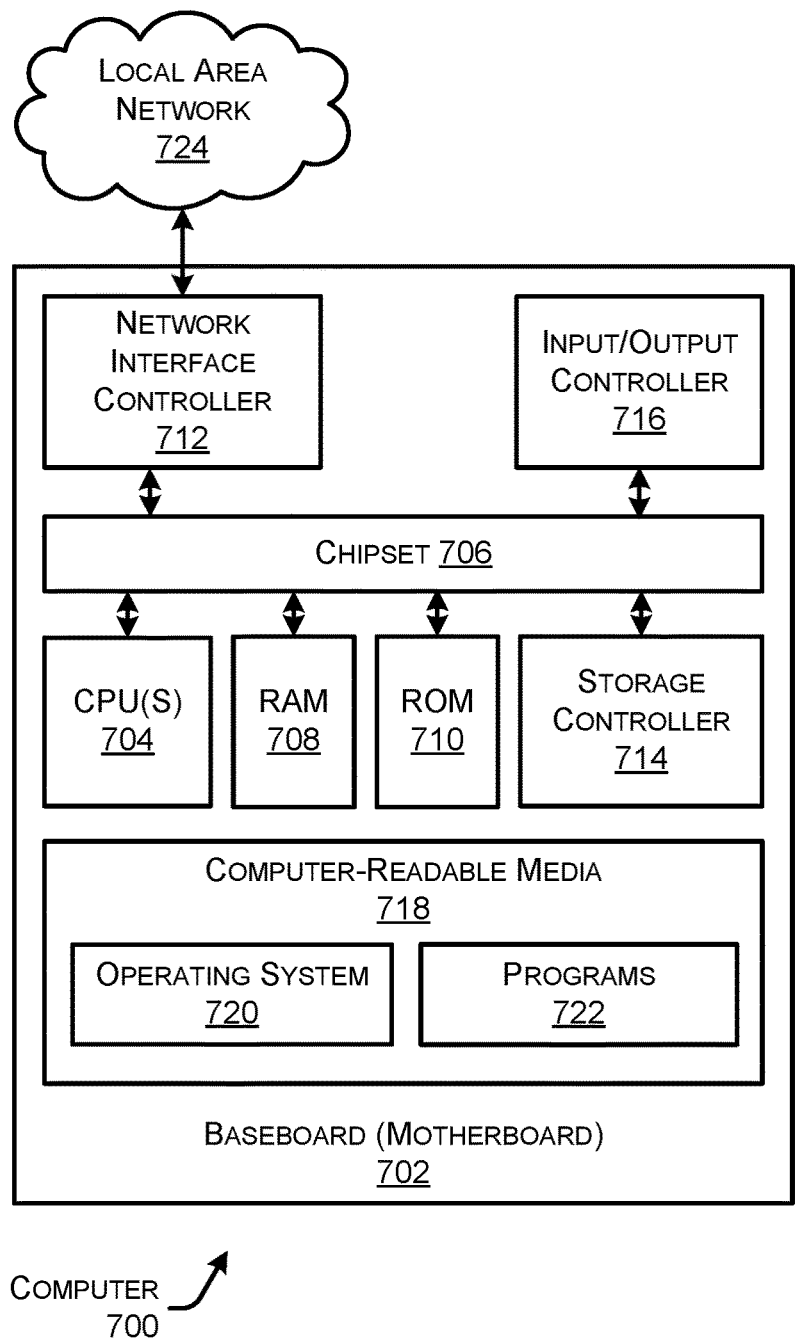
FIG. 7 illustrates a computer architecture diagram showing an example computer hardware architecture for implementing a network device that can be utilized to implement aspects of the various technologies presented herein.

FIG. 7 illustrates a computer architecture diagram showing an example computer hardware architecture for implementing a network device that can be utilized to implement aspects of the various technologies presented herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a cloud service 106 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the networks 724. The chipset 706 can include functionality for providing network connectivity through a NIC 712, such as a gigabit Ethernet adapter. The NIC 712 is capable of connecting the computer 700 to other computing devices over the networks 724. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the various components in the environment 100 may be supported by one or more devices similar to computer 700. Stated otherwise, some or all of the operations performed by the various components in the environment 100 may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a cloud service 106 including the PAPI component 114, user device 110, SDCI service 104, and/or SDWAN controller 102. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the cloud service 106, the SDCI service 104, the SDWAN controller 102, and/or the user device 110. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 722 may comprise any type of programs or processes to perform the techniques described in this disclosure. The programs 722 may enable the user device 110 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
  receiving, at a cloud service, a request for an end-to-end path between client device and a destination device, wherein the end-to-end path is at least partially established using a software-defined cloud interconnect (SDCI);
  identifying, for a user account associated with the client device, a performance requirement associated with the user account for communicating traffic over the end-to-end path;
  identifying performance data indicating performance metrics of one or more paths between one or more points of presence (POP) of the SDCI;
  calculating, at the cloud service, the path between the client device and destination device based at least in part on the performance metrics associated with the one or more paths satisfying the performance requirement associated with the user account; and
  causing data to be communicated from the client device to the destination device using the path.

2. The method of claim 1, further comprising providing, by the cloud service, an indication of the path to at least one device associated with the path.

3. The method of claim 1, further comprising:
  sending, from the cloud service and to a Software-Defined-Networking (SDN) controller associated with the cloud service, an indication of the path between the client device and the destination device; and
  programming, by the SDN controller and based at least in part on the indication, the path between the client device and the destination device, wherein programming the path includes providing an indication of the path to at least one of the one or more POP of the SDCI.

4. The method of claim 1, wherein a first path of the one or more paths between the one or more POP of the SDCI utilizes a first type of network and a second path of the one or more paths between the one or more POP of the SDCI utilizes a second type of network, the second type of network being different from the first type of network.

5. The method of claim 1, further comprising sending an indication of the path from the cloud service and to the client device, and wherein causing the data to be communicated from the client device to the destination device is based at least in part on sending the indication of the path to the client device.

6. The method of claim 5, further comprising:
  sending, from the cloud service and to a domain name service (DNS) associated with the cloud service, an indication of the user account associated with the client device;
  receiving, at the cloud service and from the DNS, an indication of a policy associated with the user account, wherein the policy indicates a service level agreement (SLA) associated with the user account; and
  wherein identifying the performance requirement associated with the user account is based at least in part on the SLA associated with the user account.

7. The method of claim 1, wherein the request includes an indication of a current location associated with the client device, and the method further comprising:
  identifying, by the cloud service and based at least in part on the current location associated with the client device, a first POP of the one or more POP of the SDCI; and
  calculating the path between the client device and the destination device based at least in part on identifying the first POP of the one or more POP of the SDCI.

8. A system comprising:
  one or more processors; and
  one or more computer-readable media storing computer-executable instructions that, when executed by the one or more processors, cause the one or more processors to perform operations comprising:
    receiving, at a cloud service, a request for an end-to-end path between client device and a destination device, wherein the end-to-end path is at least partially established using a software-defined cloud interconnect (SDCI);
    identifying, for a user account associated with the client device, a performance requirement associated with the user account for communicating traffic over the end-to-end path;

identifying performance data indicating performance metrics of one or more paths between one or more points of presence (POP) of the SDCI;

calculating, at the cloud service, the path between the client device and destination device based at least in part on the performance metrics associated with the one or more paths satisfying the performance requirement associated with the user account; and providing, by the cloud service, an indication of the path to at least one device associated with the path.

9. The system of claim 8, the operations further comprising causing data to be communicated from the client device to the destination device using the path.

10. The system of claim 8, wherein the performance data is first performance data and the performance metrics are first performance metrics, and the operations further comprising:

receiving, at the cloud service and from a Software-Defined-Networking (SDN) controller associated with the cloud service at a first time, the first performance data indicating the first performance metrics of the one or more paths between the one or more POP of the SDCI;

storing, in a database associated with the cloud service, the first performance metrics in association with the first time;

receiving, at the cloud service and from the SDN controller at a second time, second performance data indicating second performance metrics of the one or more paths between the one or more POP of the SDCI, wherein the second time is subsequent to the first time; and storing, in the database associated with the cloud service, the second performance metrics in association with the second time.

11. The system of claim 10, wherein the path is a first path, and the operations further comprising:

determining, by the cloud service and based at least in part on the performance requirement, that at least a first performance metric of the second performance metrics is more favorable than the first performance metric of the first performance metrics;

calculating, at the cloud service and based at least in part on determining that at least the first performance metric of the second performance metrics is more favorable than the first performance metric of the first performance metrics, a second path between the client device and the destination device; and causing the data to be communicated from the client device to the destination device using the second path.

12. The system of claim 8, wherein the performance requirement includes at least one of:

a bandwidth requirement;
a latency requirement;
a jitter requirement; or
a security requirement.

13. The system of claim 8, wherein the request includes an indication of a current location associated with the client device, and the operations further comprising:

identifying, at the cloud service, an edge POP associated with the SDCI based at least in part on the current location associated with the client device and the performance requirement associated with the user account;

providing an indication of the edge POP to a Software-Defined-Networking (SDN) controller associated with the cloud service to establish a first secure tunnel between the client device and the edge POP;

identifying, at the cloud service, one or more internal POP of the SDCI from among the one or more POP of the SDCI based at least in part on the performance requirement and the edge POP, the one or more internal POP of the SDCI including a first internal POP that can be connected to the edge POP;

providing an indication of the one or more internal POP of the SDCI to the SDN controller to establish a second secure tunnel using the one or more paths between the one or more internal POP of the SDCI;

providing an indication of the first internal POP of the one or more internal POP of the SDCI to the SDN controller to connect the first secure tunnel to the second secure tunnel; and causing data to be communicated from the client device to the destination device using the path based at least in part on connecting the first secure tunnel to the second secure tunnel.

14. The system of claim 13, the operations further comprising:

determining, at the cloud service, a first candidate path comprising one or more first paths between one or more first POP of the one or more POP of the SDCI, the one or more first paths being associated with first performance metrics of the performance metrics;

determining, at the cloud service, a second candidate path comprising one or more second paths between one or more second POP of the one or more POP of the SDCI, the one or more second paths being associated with second performance metrics of the performance metrics;

determining, at the cloud service and based at least in part on the performance requirement, that the first performance metrics are more favorable than second performance metrics; and wherein calculating the path between the client device and the destination device comprises calculating the path including the one or more first paths between the one or more first POP of the SDCI is based at least in part on determining that the first performance metrics are more favorable than the second performance metrics.

15. A method comprising:

receiving, at a cloud service, a request for an end-to-end path between client device and a destination device, the request indicating a performance requirement associated with a user account for communicating traffic over the end-to-end path, and wherein the end-to-end path is at least partially established using a software-defined cloud interconnect (SDCI);

identifying performance data indicating performance metrics of one or more paths between one or more points of presence (POP) of the SDCI;

calculating, at the cloud service, the path between the client device and destination device based at least in part on the performance metrics associated with the one or more paths satisfying the performance requirement associated with the user account; and causing data from the client device to be communicated to the destination device using the path.

16. The method of claim 15, wherein the request is received from a domain name service (DNS) associated with the cloud service, and the performance requirement indicates a service level agreement (SLA) associated with the user account.

17. The method of claim 15, wherein a first path of the one or more paths between the one or more POP of the SDCI utilizes a first type of network and a second path of the one or more paths between the one or more POP of the SDCI utilizes a second type of network, the second type of network being different from the first type of network.

18. The method of claim 15, wherein the performance requirement includes at least one of:
- a bandwidth requirement;
- a latency requirement;
- a jitter requirement; or
- a security requirement.

19. The method of claim 15, further comprising:
- sending, from the cloud service and to a Software-Defined-Networking (SDN) controller associated with the cloud service, an indication of the path between the client device and the destination device; and
- programming, by the SDN controller and based at least in part on the indication, the path between the client device and the destination device, wherein programming the path includes providing an indication of the path to at least one of the one or more POP of the SDCI.

20. The method of claim 15, further comprising:
- determining, at the cloud service, a first candidate path comprising one or more first paths between one or more first POP of the one or more POP of the SDCI, the one or more first paths being associated with first performance metrics of the performance metrics;
- determining, at the cloud service, a second candidate path comprising one or more second paths between one or more second POP of the one or more POP of the SDCI, the one or more second paths being associated with second performance metrics of the performance metrics;
- determining, at the cloud service and based at least in part on the performance requirement, that the first performance metrics are more favorable than second performance metrics; and
- wherein calculating the path between the client device and the destination device comprises calculating the path including the one or more first paths between the one or more first POP of the SDCI based at least in part on determining that the first performance metrics are more favorable than the second performance metrics.

* * * * *